United States Patent
Hagan (10) Patent No.: US 11,130,636 B1
(45) Date of Patent: Sep. 28, 2021

(54) TORQUE TRANSMISSION DEVICE FOR A CROSSBELT-SORTER-CART

(71) Applicant: Interroll Holding AG, Sant' Antonino (CH)

(72) Inventor: Roman Hagan, Hiram, GA (US)

(73) Assignee: Interroll Holding AG

( * ) Notice: Subject to any disclaimer, the term of this patent is extended or adjusted under 35 U.S.C. 154(b) by 0 days.

(21) Appl. No.: 16/927,108

(22) Filed: Jul. 13, 2020

(51) Int. Cl.
  *B65G 17/34* (2006.01)
  *B65G 23/02* (2006.01)
  *F16H 61/662* (2006.01)

(52) U.S. Cl.
  CPC .......... *B65G 17/345* (2013.01); *B65G 23/02* (2013.01); *F16H 61/66272* (2013.01); *B65G 2207/18* (2013.01)

(58) Field of Classification Search
  CPC ...... B65G 17/345; B65G 23/02; B65G 35/06; B65G 2207/18; F16H 61/66272
  See application file for complete search history.

(56) References Cited

U.S. PATENT DOCUMENTS

| | | | | |
|---|---|---|---|---|
| 3,912,071 A | * | 10/1975 | Nielsen | B65G 39/00 198/370.06 |
| 4,781,281 A | * | 11/1988 | Canziani | B65G 17/345 198/370.06 |
| 4,884,676 A | * | 12/1989 | Suizu | B65G 17/345 198/370.06 |
| 6,273,268 B1 | * | 8/2001 | Axmann | B65G 17/345 198/370.06 |
| 7,987,963 B2 | * | 8/2011 | Baum | B65G 17/345 198/370.06 |
| 8,689,964 B2 | * | 4/2014 | Bacic | B65G 17/345 198/370.06 |
| 9,321,594 B2 | * | 4/2016 | Droste | B65G 17/345 |

* cited by examiner

*Primary Examiner* — Gene O Crawford
*Assistant Examiner* — Keith R Campbell
(74) *Attorney, Agent, or Firm* — Gerald E. Hespos; Michael J. Porco; Matthew T. Hespos (57) ABSTRACT

A torque transmission device (1) is provided for a crossbelt-sorter-cart (200) comprising a crossbelt (210). The torque transmission device (1) comprises a rotatable drive end (10) configured to be coupled to a drive (13, 120) for driving the crossbelt (210) of the crossbelt-sorter-cart (200). A rotatable crossbelt end (20) is configured to be coupled to the crossbelt (210) of the crossbelt-sorter-cart (200). An unrotatable support (30) is configured to be fixed to the crossbelt-sorter-cart (200). A coupling (40) connects the drive end (10) to the crossbelt end (20) at the support (30). The coupling (40) allows a transmission of a drive torque originating from the rotating drive end (10) to the crossbelt end (20) and inhibits a belt torque originating from the rotating crossbelt end (20).

17 Claims, 9 Drawing Sheets

TORQUE TRANSMISSION DEVICE FOR A CROSSBELT-SORTER-CART

BACKGROUND

Field of the Invention

The invention relates to a torque transmission device for a crossbelt-sorter-cart, a crossbelt-sorter-cart for a crossbelt sorter, and a method of transmitting torque in a crossbelt-sorter-cart.

Related Art

U.S. Pat. No. 6,273,268 B1 discloses a conveyor system for sorting goods. Its disclosure is hereby incorporated by reference in its entirety. The conveyor system is also referred to as a crossbelt-sorter. Crossbelt-sorter comprise a plurality of carts, the so-called crossbelt-sorter-carts, which are connected to each other similar to the wagons of a train. The crossbelt-sorter provides a conveying path along which the crossbelt-sorter-carts are driven and that defines a conveying direction following the conveying path of the crossbelt-sorter-carts.

Each crossbelt-sorter-cart comprises a crossbelt that is arranged with a surface facing upwards for transporting goods on it. Said upper surface of the crossbelt is arranged in a substantially horizontally plane. The crossbelt may be driven in a direction that is substantially perpendicular to the conveying direction. Thus, any good arranged on the crossbelt may be discharged and/or unloaded from the crossbelt to the left and/or the right when facing in the conveying direction. The goods may, e.g., be discharged to a predetermined side when the crossbelt-sorter-cart passes a predetermined discharge position.

Known crossbelt-sorter-carts comprise an electric motor as drive means that drives the crossbelt when receiving and/or discharging goods. Because providing each crossbelt-sorter-cart with its own electric motor is expensive, U.S. Pat. No. 6,273,268 B1 discloses a method of driving the crossbelts mechanically. Therein, stationary lever arms spread along the conveying path are controlled to mechanically contact friction wheels arranged at each crossbelt-sorter-cart that drive the crossbelt. At each discharge station, the lever arms may be positioned outside of the path of the friction wheel of the passing crossbelt-sorter-cart. Thus, the friction wheel is not driven and the goods are transported further on the crossbelt-sorter-cart. Alternatively, the lever arms of the discharge station may be moved into the path of the friction wheel of the passing crossbelt-sorter-cart. This causes a rotation of the friction wheel that drives the crossbelt of the crossbelt-sorter-cart so that the goods are discharged to the side and into the discharge station.

For the known crossbelt-sorters, a problem arises whenever one of the crossbelt-sorter-carts drives along a curve at high speed. Driving the crossbelt sorter-carts at a rather high speed is desired because it enables a fast sorting of the goods and, thus, a higher performance. Inertia and/or centrifugal forces however may cause problems whenever the crossbelt-sorter-cart drives along a curve. Especially when conveying heavy goods, the centrifugal forces may accelerate the goods in a direction leading out of the curve. The goods may then accelerate the crossbelt so that the goods may fall off the crossbelt-sorter-cart to the side when driven at a high speed along a curve of the conveying path.

The above problems may occur for crossbelt-sorter-carts comprising different kinds of driving means, e.g. electric motors, engines, and/or mechanical driving means.

It is an object of the invention to enable an increased performance of a crossbelt-sorter and, in particular, an increased conveying speed of a crossbelt-sorter.

SUMMARY

An aspect relates to a torque transmission device for a crossbelt-sorter-cart comprising a crossbelt. The torque transmission device comprises a rotatable drive end configured to be coupled to a drive means for driving the crossbelt of the crossbelt-sorter-cart. A rotatable crossbelt end is configured to be coupled to the crossbelt of the crossbelt-sorter-cart. An unrotatable support is configured to be fixed to the crossbelt-sorter-cart. A coupling means is connecting the drive end to the crossbelt end at the support. Therein, the coupling means allows a transmission of a drive torque originating from the rotating drive end to the crossbelt end and inhibits a belt torque originating from the rotating crossbelt end. In particular, the coupling means may inhibit a transmission of said belt torque to the drive end.

The torque transmission device may be provided and/or arranged as a part of a crossbelt-sorter-cart of a crossbelt-sorter, so that it moves together with the crossbelt-sorter-cart along a conveying path of the crossbelt-sorter.

The crossbelt-sorter-cart comprises the crossbelt arranged in an infinite loop spanning about reversing rollers at lateral sides of the crossbelt-sorter-cart. The crossbelt may be driven to rotate about said reversing rollers so that it accelerates goods arranged on an upper surface of the crossbelt in a direction lateral to the conveying direction of the crossbelt-sorter. Therein, the conveying direction may be defined as the direction in which the crossbelt-sorter-carts are driving along a conveying path provided by the crossbelt-sorter. A driven movement of the crossbelt may be desirable when goods are charged onto and/or discharged from the crossbelt-sorter-cart.

The torque transmission device comprises two ends, namely the drive end and the crossbelt end. Both said ends may be rotated and may, thus, be rotatably arranged at the crossbelt-sorter-cart. The drive end may be coupled to the drive means that drive the crossbelt. For example, the drive end may be coupled to a friction wheel of the crossbelt-sorter-cart and/or it may even be provided as the friction wheel. Alternatively, the drive end may be coupled to a motor as the driving means. The crossbelt end may be coupled to the crossbelt, e.g. to a belt-driver like a belt drive roller accelerating the crossbelt. The crossbelt end may even be provided as a part of the belt-driver, e.g. as the barrel of the belt drive roller.

The rotation of the drive end is driven by driving means of the crossbelt-sorter-cart, for example an electric motor, an engine, or by lever arms mechanically contacting a friction wheel. The later may be constructed similar to what is disclosed by Axmann in U.S. Pat. No. 6,273,268 B1 identified in the introduction. The driving means generate the drive torque. The coupling means are configured to allow the transmission of the drive torque from the rotating drive end to the crossbelt end. Thus, whenever the drive end is rotating, also the crossbelt end is rotating. The crossbelt end may be coupled to the crossbelt so that it drives the crossbelt of the crossbelt-sorter-cart.

The unrotatable support at which the coupling means are arranged may be connected to a frame of the crossbelt-sorter-cart that prevents the support from at least rotating relative to the crossbelt-sorter-cart. Indeed, the support may be statically fixed to the crossbelt-sorter-cart so that it only moves together with the crossbelt-sorter-cart but not relative to the crossbelt-sorter-cart.

The coupling means may be connected to and/or coupled to both the drive end and the crossbelt end. The coupling means may be arranged between the drive end and the crossbelt end and it may be provided as connector between the drive end and the crossbelt end. Thus, the drive end may be coupled to the crossbelt end via the coupling means and vice versa.

Centrifugal forces may act upon the crossbelt in a curve of the conveying path, in particular whenever a load and/or goods are arranged on the upper surface of the crossbelt. Then, the crossbelt may be accelerated in a direction out of said curve. This may cause a rotation of the crossbelt end that provides the belt torque to the coupling means. This belt torque is undesired and the torque transmission device is configured to reduce and/or inhibit and/or even eliminate said belt torque. The coupling means blocks the belt torque so that the belt torque originating from the rotating crossbelt end is suppressed and, e.g., not transmitted to the drive end.

For suppressing the belt torque, the coupling means is arranged at the support. The coupling means may be connected to and/or fixed relative to the support so that it reduces and/or suppresses the rotation of the crossbelt end and does not transmit the belt torque. Rather, the coupling means remains substantially fixed to the support, thereby substantially reducing the belt torque. In this configuration, the coupling means provides a breaking function for the crossbelt that prevents the crossbelt from moving when driven by centrifugal forces and/or inertia. The coupling means of the torque transmission device may ensure that the crossbelt is only driven by the drive means coupled to the drive end and not whenever the crossbelt itself is pulled and/or pushed.

The coupling means is arranged at the unrotatable support so that it is not moving relative to the support when only a belt torque is acting upon the coupling means. However, whenever a drive torque is acting upon the coupling means, it may be at least partially detached from the support so that the coupling means may follow the rotation of the rotating drive end and the drive torque may be transmitted to the crossbelt end.

In other words, the coupling means may be arranged in at least two different states and/or attachment positions. In a fixed state and/or attachment position, the coupling means is substantially fixed relative to the support. Therein, the coupling means cannot rotate relative to the support and does not transmit any torque. Indeed, the inhibition of the transmission of the belt torque may result in inhibiting the rotation of the crossbelt end altogether. In an at least partially detached and/or freed state and/or attachment position, the coupling means may at least partially rotate relative to the support.

The coupling means may be reversibly brought from the fixed state and/or attachment position into the at least partially detached and/or freed state and/or attachment position and vice versa. The state and/or attachment position of the coupling means may be controlled and/or triggered by whether a drive torque or a belt torque is provided to the coupling means.

Thus, the coupling means may transmit the drive torque to the crossbelt end. The coupling means may be configured to inhibit any rotation of the crossbelt end that is not driven and/or caused by any drive torque originating from the rotating drive end.

In the detached state and/or attachment position, the coupling means allows a reliable driving of the crossbelt and, thus, a reliable charging and/or discharging of the goods to be sorted.

In the fixed state and/or attachment position, the coupling means inhibits the rotation of the crossbelt end and, thus, provides a breaking function for the crossbelt. Said breaking function may enable that the crossbelt-sorter-cart is driven along curves of the conveying path at a high speed without losing the goods due to centrifugal forces. This enables a faster sorting of the goods, more complex conveying paths along narrow curves and/or an increased performance of the crossbelt-sorter.

According to an embodiment, the coupling means allows the transmission of at least 80% of the drive torque originating from the rotating drive end to the crossbelt end and inhibits at least 80% of the transmission of the torque originating from the rotating crossbelt end to the drive end. The transmission of not 100% but only of at least 80% of the transmission of the drive torque may be caused by a clearance needed to switch between the different states and/or attachment positions of the coupling means relative to the support. However, the coupling means is configured to transmit most of the drive torque to the crossbelt end and to inhibit most of the belt torque to ensure both a reliable driving and breaking function.

According to an embodiment, the coupling means comprises a force element fixed to the support in a force fit. Therein, the force element may be fixed to the support in a friction force fit. The force fit may establish the fixed state and/or attachment position of the coupling means. The force fit may be sufficiently strong to prevent a rotation of the force element relative to the support whenever only a belt torque is acting upon the force element. Also whenever no torque at all is acting up on the coupling means and/or the force element, it may be fixed to the support in the force fit. However, said force fit may be at least weakened if not even disengaged completely, whenever a drive torque is acting upon the coupling means and/or the force element.

According to a further development of this embodiment, the force element is provided as a spring element, e.g. as a torsion spring. The spring element may be fixed relative to the support when no torque or only a belt torque is acting upon the spring element, and it may be deformed whenever a drive torque is acting up on the spring element so that the force fit is at least weakened.

According to an embodiment, the drive torque originating from the rotating drive end at least weakens the force fit in which the force element is fixed to the support. The weakened force fit may establish the at least partially detached and/or freed state and/or attachment position of the coupling means. This enables a relative movement of the force element and/or the coupling means relative to the support. Thus, both the drive end and the crossbelt end may rotate together with the coupling means relative to the support.

According to a further development of this embodiment, the drive end comprises an engaging drive element engaging the force element so that the torque originating from the rotating drive end at least weakens the force fit in which the force element is fixed to the support. Herein, the engaging drive element may be provided as a protrusion engaging the force element. The engaging drive element may be coupled to the drive end and/or may be provided as a part of the drive end that is rotating with the drive end. The engaging drive element may be in mechanical contact with the force element, at least when a drive torque is provided. Without the provision of the drive torque, the engaging drive element does not have necessarily to be in mechanical contact with the force element. The weakened force fit results in the at least partially detached and/or freed state and/or attachment position and enables the relative movement of the force element with respect to the support.

According to an embodiment, the belt torque originating from the rotating belt end strengthens the force fit in which the force element is fixed to the support. Thus, whenever the crossbelt is pulled and/or pushed, this force causing a belt torque even strengthens the force fit so that the force element cannot be moved relative to the support. Thus, the inhibition of the belt torque is strengthened which stops the crossbelt from moving.

According to a further development of this embodiment, the crossbelt end comprises an engaging belt element engaging the force element so that the belt torque originating from the rotating belt end strengthens the force fit in which the force element is fixed to the support. The engaging belt element may be provided as a protrusion. It may be in mechanical contact with the force element, at least whenever a belt torque is provided. The engaging belt element may be connected to the belt end and/or may be provided as part of the crossbelt and so that any rotation of the crossbelt end causes a rotating movement of the engaging belt element.

According to an embodiment, the support comprises a through hole and/or a hollow cylinder element. A rotatable element of either the crossbelt end or the drive end is rotatably mounted within said through hole and/or cylinder element. Furthermore, a rotatable element of either the drive end or the crossbelt end is rotatably mounted around said through hole and/or cylinder element. The through hole and/or cylinder element may be statically fixed relative to the crossbelt-sorter-cart. A first rotatable element of either the crossbelt and/or the drive end is rotatably mounted within this through hole and/or cylinder element, and the second rotatable element of the other of the drive and/or the crossbelt end is rotatably mounted around said through hole and/or cylinder element. The coupling means abut at the through hole and/or the cylinder element so that they inhibit the rotation of the drive end and the crossbelt end whenever only a belt torque is acting up on the coupling means. However, when a drive torque is provided to the coupling means, the coupling means allow both a rotation of the drive end and the crossbelt end.

According to an embodiment, the support comprises an axis and/or shaft, in particular a belt drive roller axis, and the drive end and/or the crossbelt end is rotatably mounted around said axis. Herein, the coupling means may be fixed relative to and detached from the axis around which both the drive end and the crossbelt end are rotatably mounted. The axis may in particular be provided as the belt drive roller axis of a belt drive roller. The belt drive roller is driving the crossbelt and, thus, responsible for its movement. This configuration is advantageous because the relevant elements like the drive end, the crossbelt end, and the coupling means may be arranged right at the position where they are needed most. Thus, this configuration may reduce the required installation space.

According to an embodiment, the drive end is rotatable about a drive axis of rotation and a rotation of the drive end about said drive axis of rotation provides the drive torque to the coupling means. Generally, the drive axis of rotation may be arranged through the crossbelt-sorter-cart arbitrarily. However, the drive axis of rotation is preferably arranged substantially vertically or horizontally. The rotation of the drive end about the drive axis of rotation may be caused by the drive means of the crossbelt-sorter-cart and/or of the crossbelt sorter. The corresponding drive torque is provided to and acting upon the coupling means. The coupling means transmit the drive torque to the crossbelt end.

According to an embodiment, the crossbelt end is rotatable about a belt axis of rotation and a rotation of the crossbelt end about the belt axis of rotation provides the belt torque to the coupling means. Generally, the belt axis of rotation may be arranged arbitrarily. Preferably, the belt axis of rotation is arranged either substantially horizontally or substantially vertically. Because the crossbelt enables a conveying of the goods in a substantially horizontal direction and substantially perpendicular to the conveying direction of the crossbelt sorter, the belt axis of rotation may also be arranged substantially horizontally through the crossbelt-sorter-cart. However, the rotating movement of any roller about which the crossbelt is rotating may also be converted into another rotating direction, e.g. into a substantially vertical direction.

According to an embodiment, the drive axis of rotation is substantially aligned with the belt axis of rotation forming a common axis of rotation. This arrangement is advantageous to decrease the loss of torque, e.g. by friction, caused by converting the torque direction. Indeed, this enables a direct transmission of the drive torque to the crossbelt end, thereby reducing potential losses.

Therein, the common axis of rotation may be arranged so that it penetrates a through hole and/or so that it is aligned with an axis of the support. Alternatively or additionally, the common axis may be aligned substantially vertically or horizontally.

According to an embodiment, the drive end comprises and/or is coupled to a rotatable friction wheel, wherein a rotation of said friction wheel provides the drive torque for driving the crossbelt of the crossbelt-sorter-cart. Indeed, the drive end may be provided as the friction wheel of the crossbelt-sorter-cart. Thus, the rotation of the friction wheel, e.g. caused by lever arms of the crossbelt sorter, generates the drive torque. The drive end either comprises the friction wheel or it may be coupled to the friction wheel, e.g. via a gear like a bevel gear.

According to an embodiment, the crossbelt end comprises and/or is coupled to a belt drive roller driving the crossbelt of the crossbelt-sorter-cart. The belt drive roller may be in mechanical contact with the crossbelt. The crossbelt end may either encompass the belt drive roller, in particular the barrel of the belt drive roller, or it may be coupled to the belt drive roller, in particular its barrel. Said coupling may be provided by a gear, for example a bevel gear.

An aspect relates to a crossbelt-sorter-cart comprising:
a frame;
a crossbelt, mounted movably relative to the frame;
a drive means for driving the movement of the crossbelt; and
a torque transmission device according to the previous aspect.

Therein, the rotatable drive end of the torque transmission device is coupled to the drive means. The rotatable crossbelt end of the torque transmission device is coupled to the crossbelt. The unrotatable support of the torque transmission device is fixed to the frame of the crossbelt-sorter-cart. The coupling means of the torque transmission device is connecting the drive end to the crossbelt end at the support so that it allows a transmission of a drive torque originating from the rotating drive end to the crossbelt end. Furthermore, the coupling means suppress a belt torque originating from the rotating crossbelt end. Thereby, the coupling means may inhibit a transmission of the belt torque to the drive end.

The drive means may either be a motor and/or engine of the crossbelt-sorter-cart. Alternatively, the drive means may be a friction wheel that may be driven by lever arms of the crossbelt sorter so that it rotates and generates the drive torque. The drive end of the torque transmission device may even be provided as the friction wheel.

The crossbelt end may be coupled to the crossbelt directly or via one or more further component(s). For example, the crossbelt end may either be coupled to the crossbelt by being in mechanical contact with it, or it may be coupled to a gear like a bevel gear converting and/or transmitting the drive torque to a belt drive roller driving the crossbelt.

The coupling means may be fixed to the support so that they do not move relative to the support when either no torque or only a belt torque is provided. However, whenever a drive torque is generated, the coupling means may become at least partially detached from the support to enable the transmission of the drive torque.

Because the crossbelt-sorter-cart may comprise the torque transmission device according to the previous aspect, the description of the torque transmission device also applies to the crossbelt-sorter-cart and vice versa.

An aspect relates to a crossbelt sorter comprising at least one crossbelt-sorter-cart of the previous aspect.

A further aspect relates to a method of transmitting torque in a crossbelt-sorter-cart comprising a crossbelt, the method comprising the steps:
  Coupling a rotatable drive end of a torque transmission device to a drive means for driving the crossbelt of the crossbelt-sorter-cart;
  coupling a rotatable crossbelt end of a torque transmission device to the crossbelt of the crossbelt-sorter-cart;
  fixing an unrotatable support to the crossbelt-sorter-cart, connecting the drive end to the crossbelt and at the support by a coupling means of the torque transmission device;
  allowing the transmission of a torque originating from the rotating drive end to the crossbelt end; and
  inhibiting a belt torque originating from the rotating cross belt end.

The method may be implemented in a torque transmission device, crossbelt-sorter-cart and/or a crossbelt sorter according to any of the previous aspects. Therefore, the description of the previous aspects also applies to the method and vice versa.

Herein, the terms upper, lower, below, above, etc. refer to the reference system of the Earth in a mounting position of the subject-matter.

The numbers and/or angles given in the claims and the description are not limited to the exact numbers and/or angles, but may include measurement inaccuracies within limits that still enable solving the underlying problem.

The conveying direction is the direction that follows the conveying path of the crossbelt-sorter-carts along the crossbelt sorter in a substantially horizontal direction. It may encompass curves and/or inclinations along the conveying path.

The lateral direction is usually considered a direction substantially perpendicular to the conveying direction and substantially horizontally. It may refer to the right and left side of the conveying path.

The invention is further illustrated in reference to embodiments shown in the figures. Embodiments of the invention are described with reference to the figures. Features of the embodiments shown in the figures may be combined with alternative embodiments. Identical reference numbers may identify identical or similar features of the embodiments.

DETAILED DESCRIPTION

Figure 1:
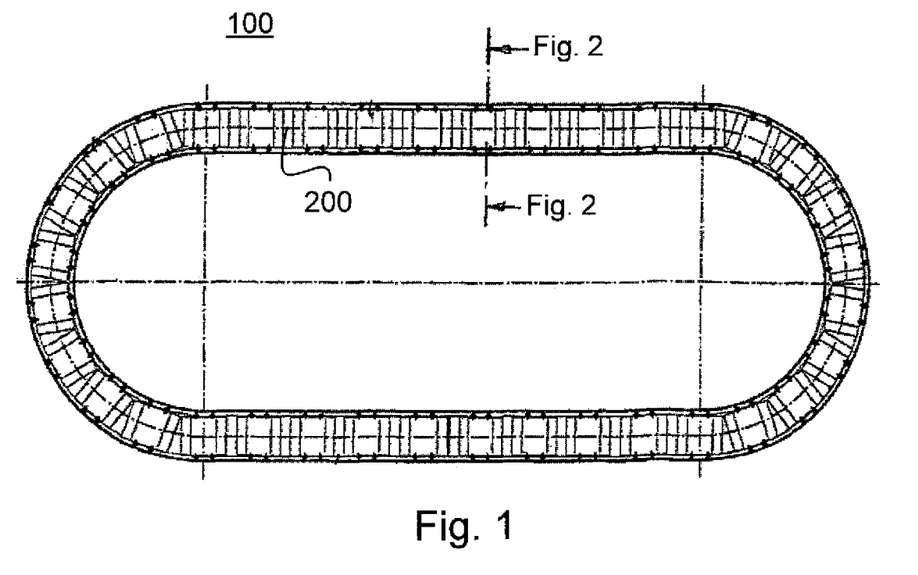
FIG. 1 is a top view of an embodiment of a crossbelt-sorter.

FIG. 1 is a top view of an embodiment of a crossbelt sorter 100. The crossbelt sorter 100 comprises a plurality of crossbelt-sorter-carts 200 travelling in conveying direction along a closed loop as conveying path. The closed loop may have a more complex form than shown schematically in FIG. 1. For example, the closed loop may comprise further curves and/or inclinations along which the crossbelt-sorter-carts 200 may travel.

Alternatively to the so called "horizontal" crossbelt sorter 200 with the closed loop, the crossbelt sorter may be provided as a so called "vertical" crossbelt sorter comprising a lower run along with the crossbelt-sorter-carts are transported back upside-down, similar to the one disclosed in U.S. Pat. No. 6,273,268 B1 mentioned above.

Figure 2:
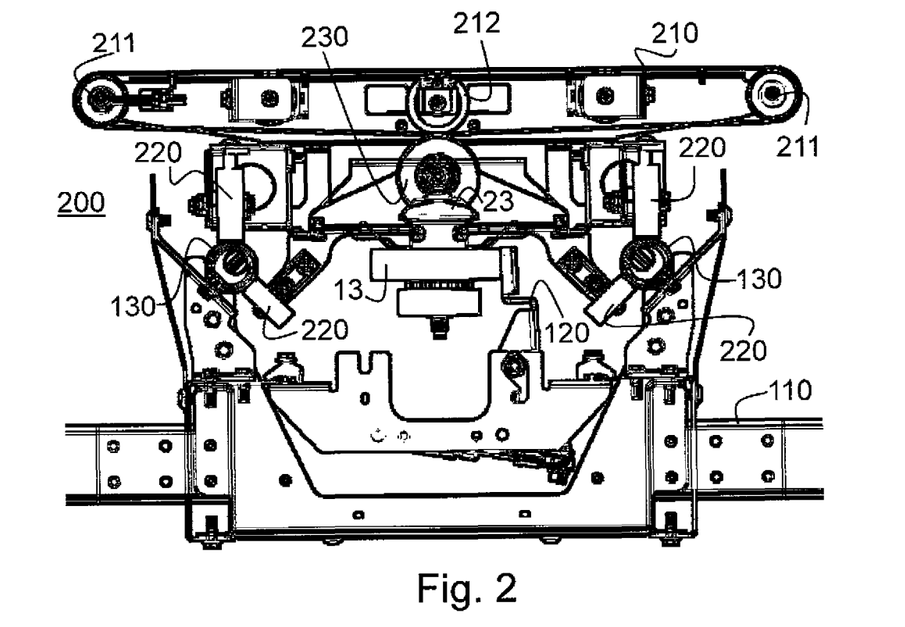
FIG. 2 is a sectional view of an embodiment of a crossbelt-sorter-cart along a line indicated in FIG. 1.

FIG. 2 shows a sectional view of an embodiment of a crossbelt-sorter-cart 200. The sectional view may, for example, be the one indicated in FIG. 1 by the marked line. The crossbelt-sorter-cart 200 comprises a plurality of guide rollers 220 that roll along rails 130 of the crossbelt sorter 100. The rails 130 define the conveying path of the crossbelt-sorter-cart 200 and may follow the closed loop shown in FIG. 1. In the shown embodiment, the crossbelt-sorter-cart 200 comprises at least four guide rollers 220, two of which rolling on the rails 130 from above and the two others rolling on the rails 130 from an inclined direction from below. The rails 130 may be connected to and/or supported by a frame 110 of the crossbelt sorter 100.

Each crossbelt-sorter-cart 200 comprises a crossbelt 210 spanned in a loop about two reversing rollers 211 at the upper end of the crossbelt-sorter-cart 200. The upper surface of the crossbelt 210 forms a transporting surface for goods and/or wares that may be transported along the crossbelt sorter 100. The crossbelt 210 is tensioned between the reversing rollers 211 so that it may roll about said reverse rollers 211 from a left lateral side to a right lateral side of the crossbelt-sorter-cart 200 and vice versa. The crossbelt 210 is used to discharge the goods conveyed along the crossbelt sorter 100 to the left and/or right whenever the crossbelt-sorter-cart 200 passes the desired destination. For example, the crossbelt sorter 100 may comprise discharge stations as shown in U.S. Pat. No. 6,273,268 B1 mentioned above.

The crossbelt 210 is driven by a belt drive roller 230 and arranged below crossbelt 200 and pressing up against the lower run of the crossbelt 210. The axis of rotation of the belt drive roller 230 is substantiallly parallel to the conveying direction of the crossbelt sorter 100 and/or substantially horizontally. The belt drive roller 230 is driven via a bevel gear 23 transmitting a substantially vertically aligned torque originating from a rotation of a friction wheel 13 to the belt drive roller 230.

The friction wheel 13 is arranged at a lower section of the crossbelt-sorter-cart 200 so that its axis of rotation is substantially vertically aligned. In the shown embodiment, the friction wheel 13 comprises two disks with different diameters, an upper larger disk and a lower smaller disk. Depending upon which of the two disks of the friction wheel 13 is driven by a lever arm 120 of the crossbelt sorter 100, the friction wheel of 13 either accelerates the crossbelt 210 in a fast or a slow manner.

At a plurality of positions along the conveyor 100, said conveyor 100 may comprise one or more pivotable lever arms 120 that may either be arranged so that they do not contact the friction wheels 13 of the passing crossbelt-sorter-carts 200 or that they engage and drive them. The friction wheels 13 may be driven either when a load is received and charged onto the crossbelt 210 and/or it may be driven when said load is discharged at its predetermined destination along the conveying path.

FIG. 2 shows only a single lever 120 at a right side. However, another lever 120 may be arranged at the left side. Depending upon which of the levers is activated and moved into the path of the friction wheel 13, the crossbelt 210 may be driven to the right or driven to the left when facing in conveying direction as in the view shown in FIG. 2. The activation of the friction wheel 13 by the lever arms 120 is explained in further detail in U.S. Pat. No. 6,273,268 B1 mentioned before.

Whenever the crossbelt-sorter-cart 200 is driven along a curve, centrifugal forces acting upon the load arranged on the crossbelt 210 may accelerate the crossbelt 210 so that the load may be moved to the lateral side and/or out of the curve. To inhibit this unwanted acceleration of the crossbelt 210, the crossbelt-sorter-cart 200 comprises a torque transmission device 1 (not shown in FIG. 2) that provides a break or stop function.

Figure 3A:
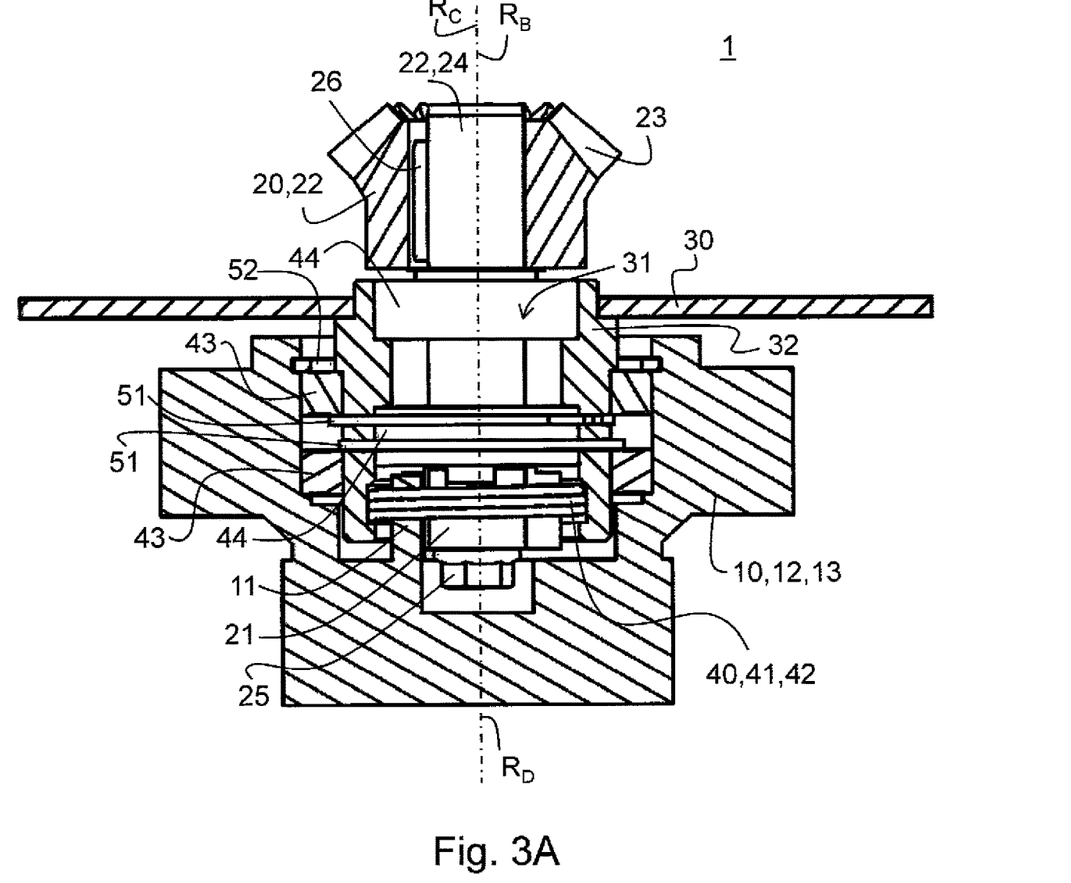
FIG. 3A is a sectional view through one embodiment of a torque transmission device for a crossbelt-sorter-cart wherein torque is transmitted along a vertical axis.

FIG. 3A shows a sectional view through one embodiment of such a torque transmission device 1 for the crossbelt-sorter-cart 200. In this embodiment, the torque transmission device 1 comprises components that may rotate about a substantially vertically aligned axis of rotation. Some elements of the torque transmission device 1 are better shown in the perspective sectional view shown in FIG. 3B.

A lower end of the torque transmission device 1 is provided by the friction wheel 13 of the crossbelt-sorter-cart 200. The friction wheel 13 is shown in FIG. 3A and omitted in FIG. 3B. It serves as a drive end 10 and, in particular, as a rotatable element 12 of the drive end 10. The friction wheel 13 and, thus, the drive end 10 is rotatable about a drive axis of rotation $R_D$ indicated by a dashed line. The drive axis of rotation $R_D$ is aligned substantially vertically.

The torque transmission device 1 is configured to transmit any drive torque originating from the rotation of the drive end 10 to a crossbelt end 20 of the torque transmission device 1. The crossbelt end 20 is provided by a bevel gear 23 that may transmit and/or couple the torque to the belt drive roller 230 shown in FIG. 2. At its upper end, the bevel gear 23 comprises teeth at inclined outer surfaces that may engage corresponding teeth of a similar bevel gear arranged at the shaft and/or axis of rotation of the belt drive roller 230 (cf. FIG. 2).

The bevel gear 23 is provided as the crossbelt end 20 and provides a rotatable element 22 of the crossbelt end 20. Said rotatable element 22 of the crossbelt end 20 and the crossbelt end 20 as a whole is rotatable about a belt axis of rotation $R_B$. The belt axis of rotation $R_B$ is substantially vertically aligned and substantially aligned with the drive axis of rotation $R_D$. Thus, the drive axis of rotation $R_D$ and the belt axis of rotation $R_B$ form a (here: substantially vertically aligned) common axis of rotation $R_C$.

The torque transmission device 1 is arranged at a support 30 of the crossbelt-sorter-cart 200. The support 30 may be provided as a plate. It may comprise a through-hole 31 provided through the support 30 at the common axis of rotation $R_C$. In the shown embodiment, the support 30 further comprises a cylinder element 32 encompassing the common axis of rotation $R_C$ at its cylinder axis. The cylinder element 32 is statically fixed to the support 30 and moves only together with the whole crossbelt-sorter-cart 200. The whole support 30 including the cylinder element 32 is unrotatable relative to the crossbelt-sorter-cart 200 but moves together with the whole crossbelt-sorter-cart 200.

At an outside of the cylinder element 32, outer bearings 43 are arranged. The outer bearings 43 couple the support 30 to the drive end 10 and enable the rotation of the drive end 10 about the cylinder element 32. Within the cylinder element 32, a drive shaft 24 is arranged. The drive shaft 24 comprises an axis of rotation aligned with the common axis of rotation $R_C$. The drive shaft 24 may be fixed to the crossbelt end 20, e.g. at the bevel gear 23. Thus, the drive shaft 24 rotates together with the crossbelt end 20. Also the drive shaft 24 may be considered as a rotatable element 22 of the crossbelt end 20.

The drive shaft 24 is arranged within the cylinder element 32 and the through-hole 31 of the support 30 so that its axis of rotation is aligned with the centerline of the through-hole 31 and/or the cylinder axis of the cylinder element 32. The drive shaft 24 is rotatably held within the cylinder element 32 by inner bearings 44. The inner bearings 44 are fixed to the inside of the cylinder element 32 with their outer sides and may be coupled to and/or hold the drive shaft 24 arranged within.

Whenever the friction wheel 13 is activated by a lever arm 120 (cf. FIG. 2), it rotates about the common axis of rotation $R_C$. The friction wheel 13 rotates about the cylinder element 32 and couples its drive torque via coupling means 40 to the drive shaft 24. The drive shaft 24 rotates within the cylinder element 32 and transmits its torque to the bevel gear 23 at the crossbelt end 20 of the torque transmission device 1.

The torque transmission device 1 is configured to at least inhibit a belt torque originating from the rotation of the crossbelt end 20, e.g. also its transmission to the friction wheel 13. The torque transmission device 1 may be configured to substantially inhibit any rotation of the crossbelt end 20 together with the rotation of the bevel gear 23 caused by the crossbelt torque. This enables a stop and/or break function for the crossbelt 210. Whenever the rotation of the crossbelt end 20 and the bevel gear 23 is blocked, also the crossbelt 210 cannot move because it is coupled to the crossbelt end 20 without idle.

Figure 3B:
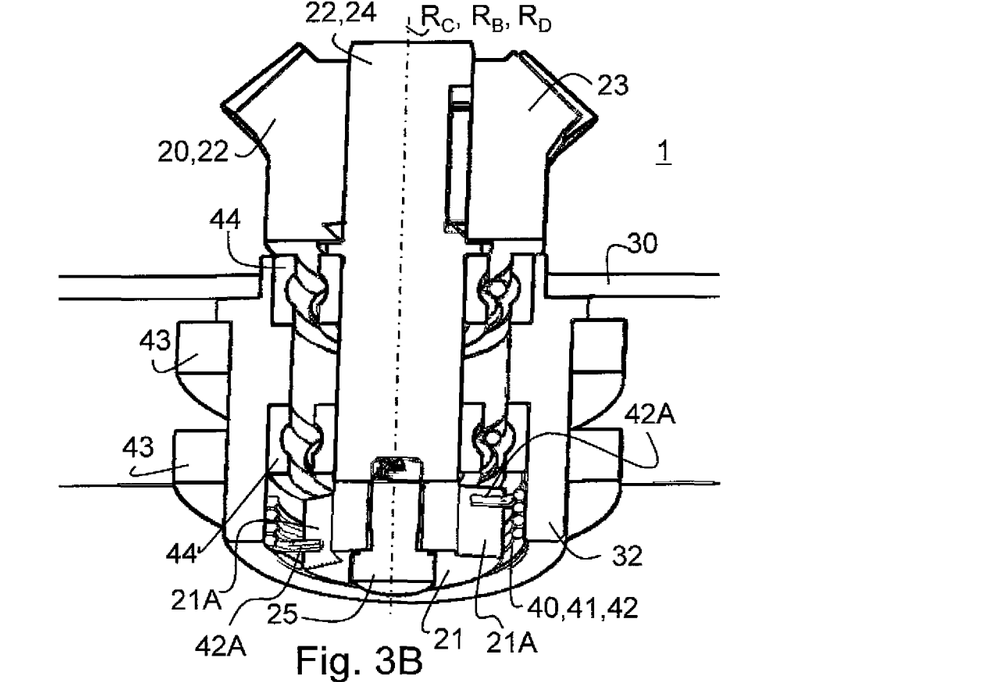
FIG. 3B is a perspective view of a section of the torque transmission device of FIG. 3A.

As shown in FIG. 3B, the coupling means 40 are provided as a force fit element 41, in particular as a spring element 42. The spring element 42 may be provided as a torsion spring comprising radially inwardly bent ends 42A. The force fit element 41 is arranged within the cylinder element 32 in a force fit so that the cylinder axis of the torsion spring substantially overlaps the cylinder axis of the cylinder element 32 and/or the common axis of rotation $R_C$. In the shown embodiment, the force fit element 41 presses onto the inside of the cylinder element 32 causing a friction force fit between them. Thus, the force fit element 41 may only rotate about the common axis of rotation $R_C$ against the friction force fit in which it is held against the inside of the cylinder element 32.

The crossbelt end 20 is coupled to an engaging belt element 21 via the drive shaft 24. The engaging belt element 21 is arranged at least partially within the coupling means 40. In the embodiment, the engaging belt element 21 is arranged at the center of the force fit element 41. The engaging belt element 21 is fixed to the drive shaft 24 by a fixing element 25, e.g. a screw. In an embodiment, the engaging belt element 21 may be provided as an element of the drive shaft 24, e.g. a protrusion of the drive shaft 24.

Figure 3C:
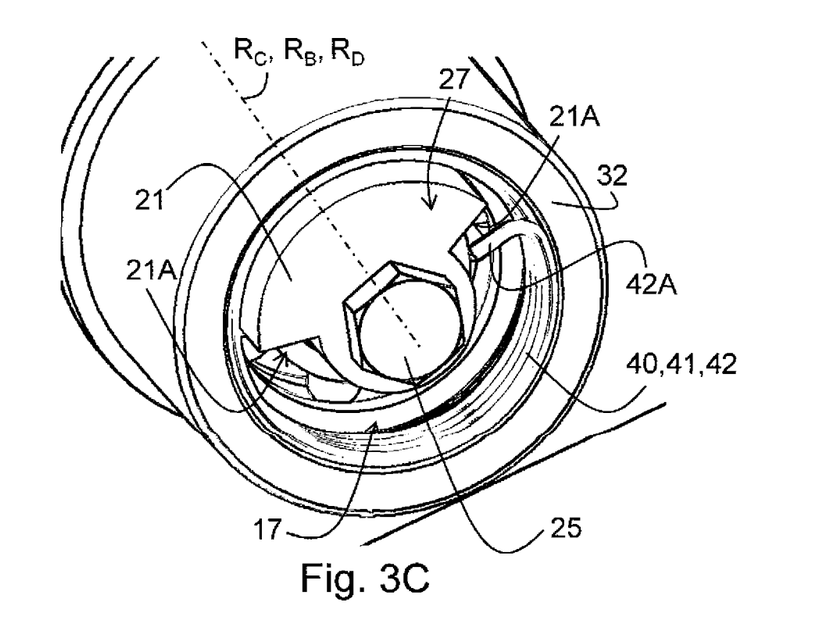
FIG. 3C is a perspective view of a coupling means of the torque transmission device of FIGS. 3A and 3B.

FIG. 3C shows a perspective view of the coupling means 40 from a diagonal direction from below. Therein, the friction wheel 13 is omitted. FIG. 3C shows the lower end of the cylinder element 32. The cylinder element 32 may be a barrel of a cylinder that is statically fixed to the support 30 at the through-hole 31 so that the centerline of the through-hole is substantially arranged at the cylinder axis of the cylinder element 32.

FIG. 3C shows the windings and/or coils of the torsion spring being pressed to the inside of the cylinder element 32 in the friction force fit. Each of the two ends of the spring element 42 is bent radially inwardly and, thus, forms an inwardly bent end 42A pointing to the inside of the cylinder element 32 roughly towards the common axis of rotation $R_C$. The inwardly bent ends 42A provide two separate obstacles within the hollow inside of the cylinder element 32.

The engaging belt-element 21 may mechanically contact these obstacles, i.e. the inwardly bent ends 42A of the spring element 42 when it is rotated about the common axis of rotation $R_C$. The rotation of the engaging belt element 21 may originate from the crossbelt 210 being accelerated due to centrifugal forces (cf. FIG. 2). The engaging belt element 21 comprises a ring section arranged around the common axis of rotation $R_C$. Said ring section ends at its opposite ends at two engaging flanks 21A, each facing a corresponding one of the two inwardly bent ends 42A. The engaging flank 21A is provided as a surface facing its corresponding inwardly bent end 42A. Both are substantially vertically aligned in the embodiment shown in FIGS. 3A-3C.

Under the provision of a belt torque, the engaging belt element 21 may rotate about the common axis of rotation $R_C$ so that one of its engaging flanks 21A presses upon the corresponding inwardly bent end 42A. Depending upon the direction of said belt torque (clockwise or counterclockwise), the engaging belt element 21 will press upon the corresponding inwardly bent end 42A arranged in the direction in that the engaging belt element 21 is moved.

The spring element 42 is arranged and oriented within the cylinder element 32 so that upon contact of the engaging beltelement 21 with the corresponding inwardly bent end 42A, the friction force fit within the cylinder element 32 is strengthened. The push from the engaging flanks 21A onto its corresponding inwardly bent end 42A will try to expand the torsion spring 42 and increase its outer diameter. Thus, the spring element 42 is pressed even harder onto the inside of the cylinder element 32. The provided belt torque strengthens the friction force fit so that the coupling means 40 cannot rotate about the common axis of rotation $R_C$. This blocks and/or inhibits the rotation of the engaging belt element 21 and, thus, the rotation of the belt end 20 and the whole bevel gear 23. Thereby, the belt torque is suppressed and inhibited from being transmitted to the friction wheel 13. Most importantly, the rotation of the bevel gear 23 is suppressed so that the crossbelt 210 cannot accelerate upon the crossbelt-sorter-cart 200 (cf. FIG. 2). The torque transmission device 1 inhibits the transmission of the belt torque to the drive end 20 and provides a stopping and/or breaking function for the crossbelt 210.

The drive end 10 also comprises an engaging element, namely and engaging drive element 11 that engages the coupling means 40. In the embodiment, the engaging drive element 11 is provided as a part of the friction wheel 13 that is omitted in FIG. 3C. However, the engaging drive element 11 is shown in FIG. 3A and protrudes into the spring element 42 from below. In an assembled state, the drive engaging element 11 will be arranged within a drive-side space 17 indicated in FIG. 3C. Said drive-side space extends between the two inwardly bent ends 42A on the opposite side of the engaging belt element 21 and within the spring element 42. Therein, the engaging drive element 11 may form a counterpart to the engaging belt-element 21.

Upon rotation of the friction wheel 13, the drive end 10 rotates about the common axis of rotation $R_C$ and, thus, also the engaging drive element 11 is rotating within the drive-side space 17 about the common axis of rotation $R_C$. Similar to the engaging belt element 21, the engaging drive element 11 may engage flanks that may come in mechanical contact with the inwardly bent ends 42A of the spring element 42.

The engaging drive element 11 will contact the opposite side of the inwardly bent ends 42A than the engaging belt element 41. This pressure on said opposite side may weaken the friction fit. This is because the spring element 42 is arranged and oriented within the cylinder element 32 so that upon contact of the engaging drive element 11 with the inwardly bent ends 42A, the spring element 42 is tensioned and, thus, its force fit within the cylinder element 32 is weakened. The contact with the engaging drive element 11 may substantially cancel the frictional force fit within the cylinder element 32. Thus, the whole coupling means 40 may rotate about the common axis of rotation $R_C$ upon impact of the engaging drive element 11 with the inwardly bent ends 42A. Thus, a drive torque originating from the rotation of the friction wheel 13 weakens the force fit of the spring element 42 and, thus, enables its rotation and the transmission of the drive torque via the drive shaft 24 to the bevel gear 23 and the belt end 20.

In other words, the torque transmission device 1 may inhibit the rotation of the belt end 20 and an according belt torque while enabling a reliable transmission of the drive torque originating from the rotation of the friction wheel 13 to the bevel gear 23 and, thus, to the belt drive roller 230 (cf. FIG. 2).

Figure 4:
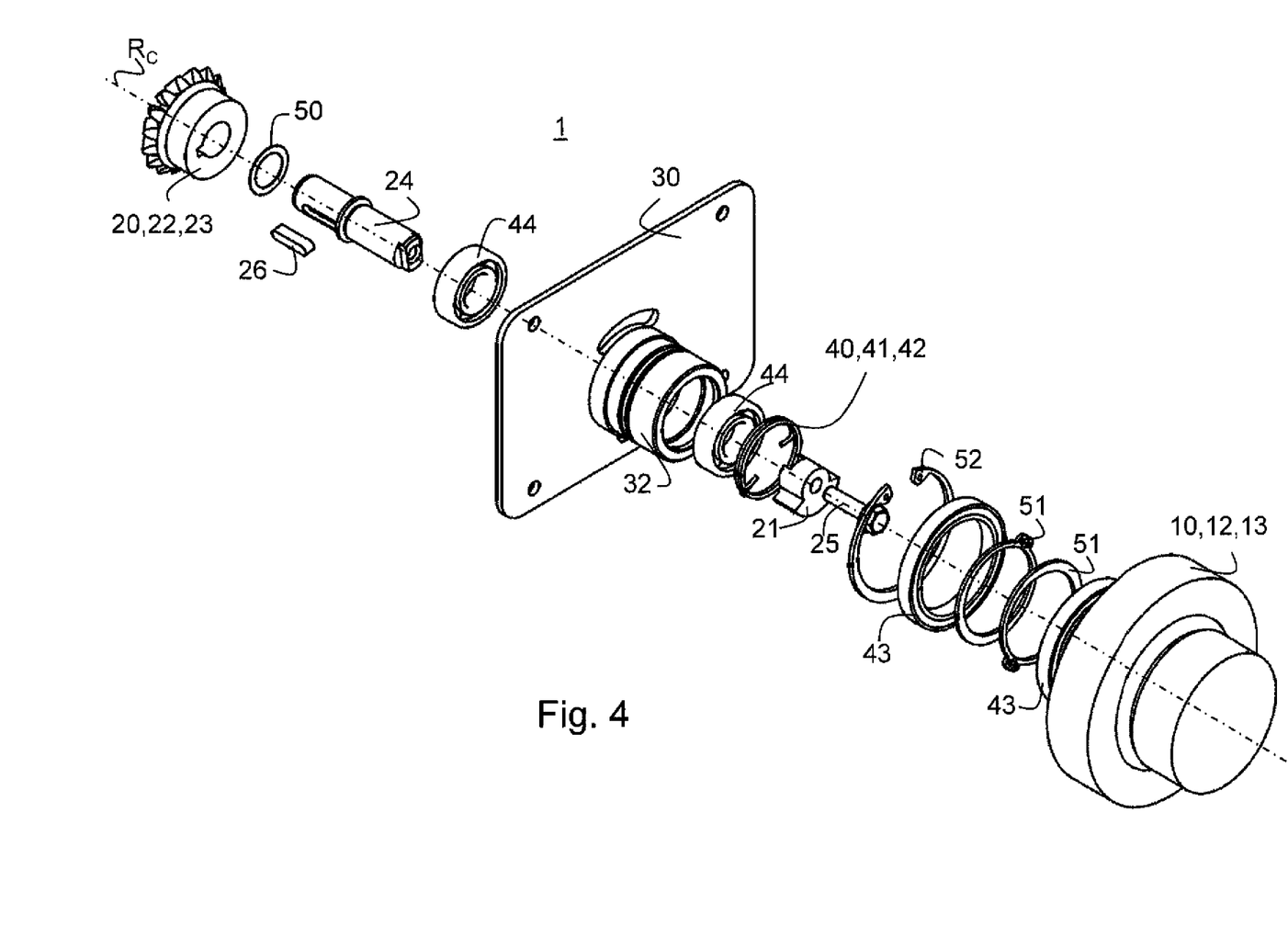
FIG. 4 is an exploded perspective view of the torque transmission device of FIGS. 3A to 3C.

FIG. 4 shows a perspective exploded view of the torque transmission device 1 shown in FIGS. 3A to 3C. Roughly in the centre of FIG. 4, the support 30 is shown with the cylinder element 32. To the left of the support 30, corresponding to an upper position in an assembled state, the bevel gear 23 is shown as the crossbelt end 20 of the gear transmission device 1. The shaft 24 is fixed to the bevel gear 23 by a feather key 26 engaging into a groove and/or notch within the drive shaft 24 and/or within the bevel gear 23. A support ring 50 may also be provided to ensure said connection. A first of the inner bearings 44 is shown at the left side of the support plate 30.

On the other side of the support 30, i.e. in a position that is arranged below the support in the assembled state, the other inner bearing 44 is shown together with the coupling means 40 provided as a spring element 42. The spring element 42 is arranged so that its two ends bent inwardly towards the common axis of rotation $R_C$.

FIG. 4 further shows the engaging belt element 21 and the fixing element 25. A snap ring 52 and/or retaining rings 51 may be provided to ensure the position of the outer bearings 43 enabling the rotation of the friction wheel 13 as drive end 10 about the outer barrel of the cylinder element 32.

All of the above elements of the torque transmission device 1 that comprise a circular and/or cylindric form are arranged so that their centerline and/or cylinder axis is substantially aligned with the common axis of rotation $R_C$.

In an alternative embodiment not shown in the figures, the drive axis of rotation $R_D$ does not necessarily have to be aligned with the belt axis of rotation $R_B$. These axes may be inclined to each other with the coupling means arranged at their intersection.

Figures 5A, 5B:
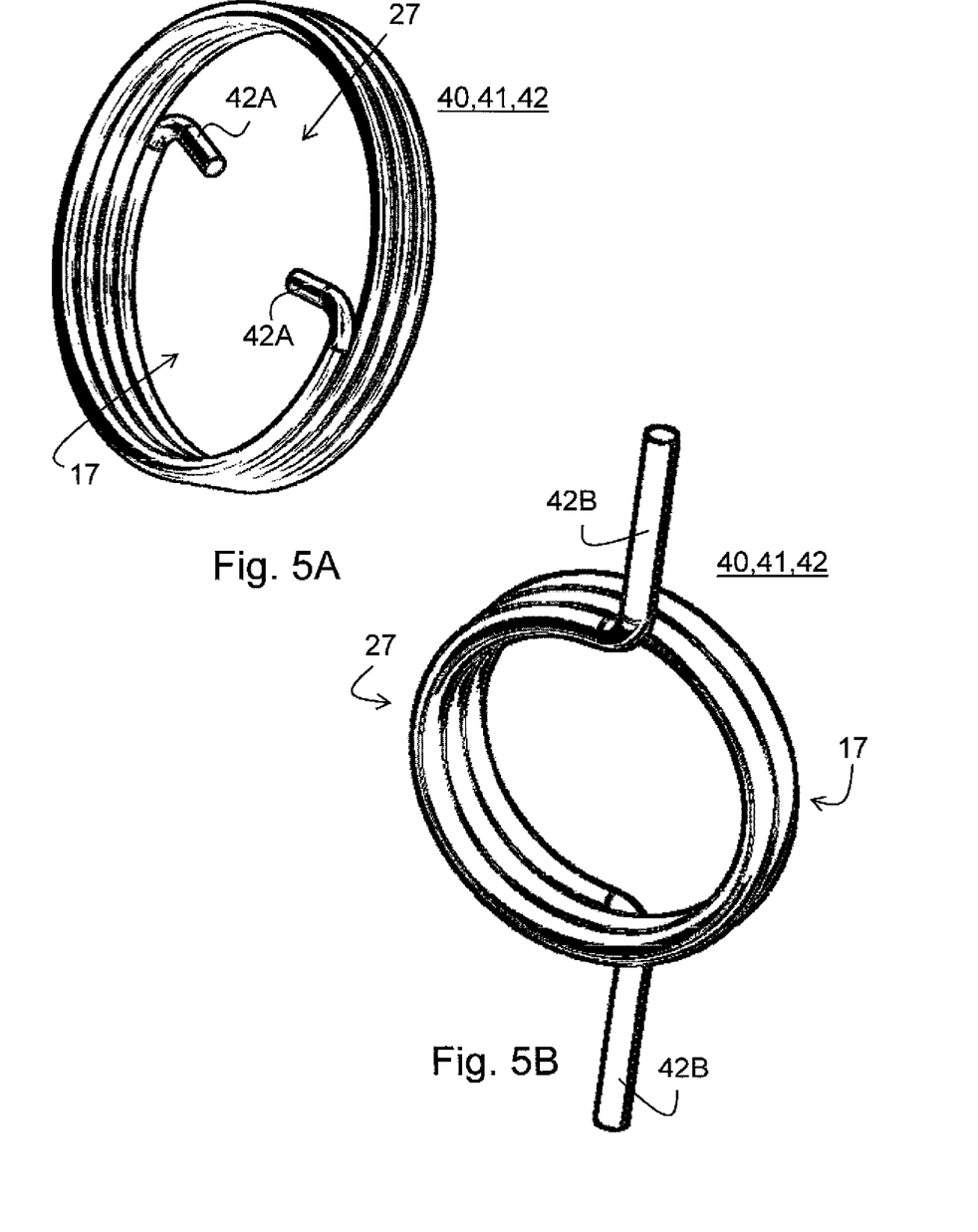
FIG. 5A is a perspective view of an embodiment of a coupling means provided as a torsion spring comprising inwardly bent ends.
FIG. 5B is a perspective view of an embodiment of a coupling means provided as a torsion spring comprising outwardly bent ends.

FIG. 5A shows the spring element 42 as used in the torque transmission device 1 of FIGS. 3 and 4. The spring element 42 is provided as torsion spring with two inwardly bent ends 42A that separate the inside of the torsion spring into two sections, namely a belt-side space 27 and the drive-side space 17. The belt-side space 27 is the area within the spring element 42 from which pressure onto the inwardly bent ends 42A of the spring element 42 will increase the diameter of the spring element 42 and, thus, strengthen the friction fit within the cylinder element 32. The drive side space 17 is the area from which a pressure onto the inwardly bent ends 42A of the spring element 42 will decrease the total diameter of the torsion spring and, thus, weaken the friction of force fit within the cylinder element 32.

FIG. 5B shows an alternative embodiment of a spring element 42 as coupling means 40 and force fit element 41. In this alternative embodiment, the spring element 42 comprises radially outwardly bent ends 42B. This embodiment of the spring element 42 may be assembled in a friction force fit upon an element protruding through the spring element 42. As shown in reference to the following figures, the spring element 42 shown in FIG. 5B may be arranged upon a shaft-like and/or axis-like support in another embodiment of the torque transmission device 1.

The outwardly bent ends 42B of the torsion spring define the limits between the drive-side space 17 and the belt-side space 27 outside of the spring element 42. Similar as in the previous embodiment, a pressure from the drive-side space 17 upon at least one of the outwardly bent ends 42B may weaken the friction fit of the spring element 42 by increasing its inner diameter. Thereby, the friction fit on the shaft-like support may be released. Pressure from the belt-side space 27 upon the outwardly bent ends 42B will strengthen the friction force fit by reducing the inner diameter of the spring element 42.

Figure 6:
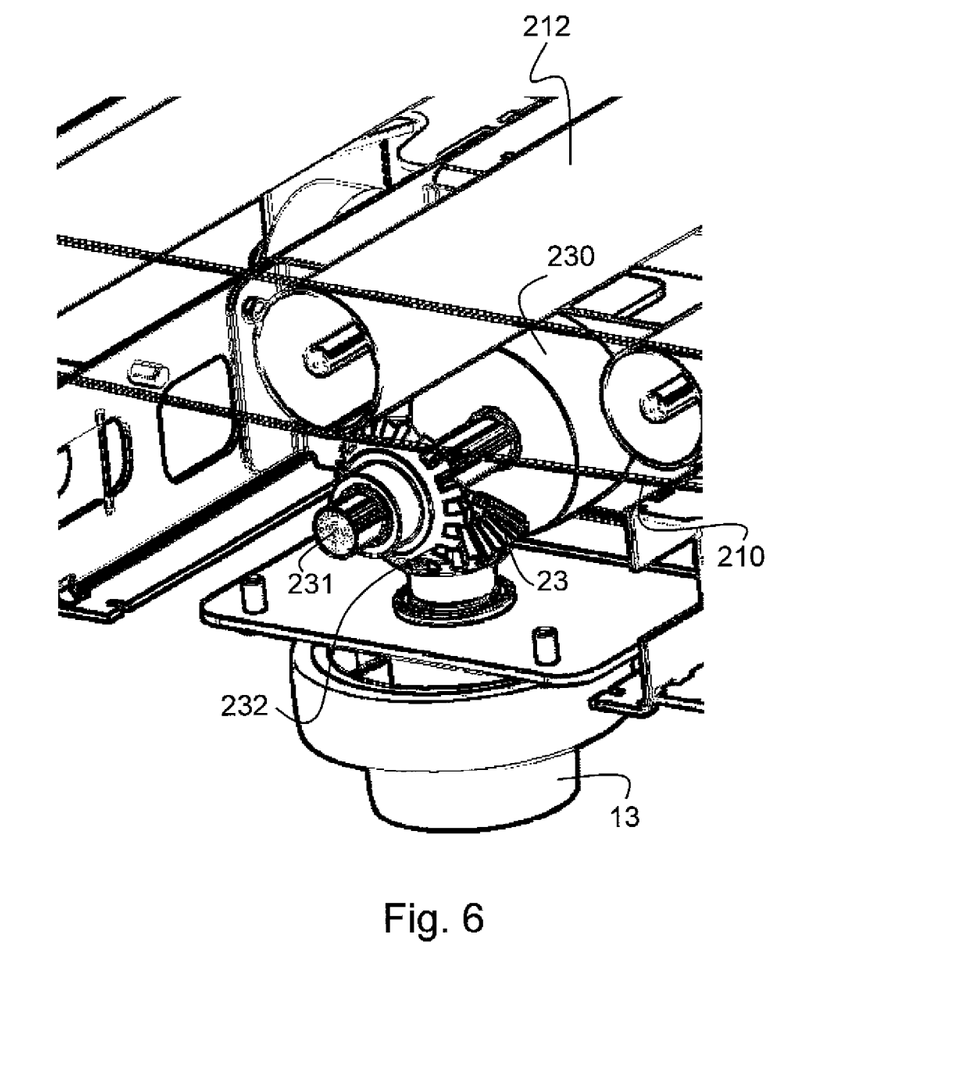
FIG. 6 is a perspective view of a gear of a crossbelt-sorter-cart, wherein the gear is transmitting a vertical torque provided by a friction wheel into a horizontal torque of a belt drive roller.

FIG. 6 shows a perspective view of a gear of a crossbelt-sorter-cart 200. FIG. 6 shows the friction wheel 13 at a lower section that drives the bevel gear 23 by a substantially vertically aligned torque. The rotation of the bevel gear 23 is transmitted via diagonally aligned teeth onto a belt drive roller bevel gear 232 arranged upon a belt drive roller axis and/or shaft 231. The belt drive roller axis 231 is arranged essentially horizontally and substantially parallel to a conveying direction of the crossbelt sorter 100 (cf. FIG. 1). Thus, the torque provided by the rotation of the friction wheel 13 may be used to drive a rotation of the belt drive roller 230 rotating about and/or with the roller axis 231. This is comparable to the situation as shown in FIG. 2.

The rotation of the belt drive roller 230 may cause an opposed rotation of a pressure roller 212, because their barrels are pressed together and/or biased. The barrels of the pressure roller 212 and the belt drive roller 230 may be in (at least indirect) mechanical contact with each. The pressure roller 212 and the belt drive roller 230 may rotate together about axes that are substantially parallel to each other in opposite directions.

Between the barrels of the pressure roller 212 and the belt drive roller 230, the lower run of the crossbelt 210 is arranged (thus the indirect mechanical contact between them). The crossbelt 210 is only shown stylized in FIG. 6 by the two lines. Otherwise, the surface of the crossbelt 210 would block the view onto the elements of the crossbelt-sorter-cart 200. The upper run of the crossbelt 210 may run over an upper side of the pressure roller 212 while the lower run is arranged between the lower side of the pressure roller 212 and the upper side of the belt drive roller 230. Thus, a rotation of the belt drive roller 230 causes the crossbelt 210 to move between the belt drive roller 230 and the pressure roller 212.

Similarly, an acceleration of the crossbelt 210 will also cause a rotation of the belt drive roller 230. Without the torque transmission device 1, its rotation would be transmitted by the gear 232, 23 to the friction wheel 13. Such an acceleration of the crossbelt 210 caused by, e.g., centrifugal forces may be suppressed by the torque transmission device 1 by inhibiting the rotation of the bevel gear 23 and/or the belt drive roller 230.

Figure 7A:
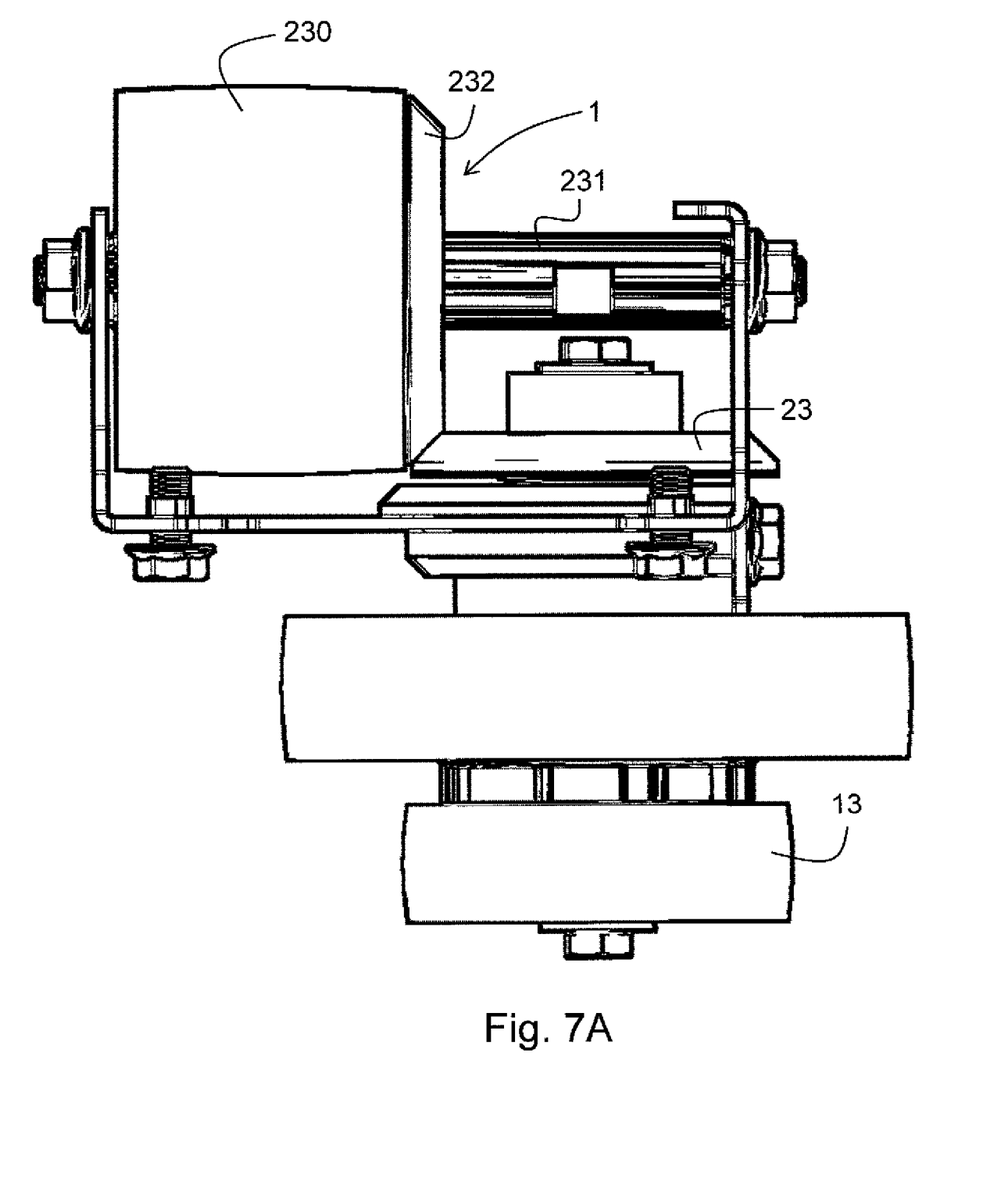
FIG. 7A is a side view of an embodiment of a torque transmission device for a crossbelt-sorter-cart wherein torque is transmitted along a horizontal axis.

FIG. 7A shows a side view of an embodiment of a torque transmission device 1 for a crossbelt-sorter-cart. Therein, the torque is transmitted along a substantially horizontally aligned axis. FIG. 7A shows an embodiment arranged a position close to the gear which converts a vertical torque into a horizontal torque, similar to the gear 23, 232 shown in FIG. 6.

At a lower section, the friction wheel 13 is arranged as also shown in FIGS. 2 and 6. The friction wheel 13 may be driven by lever arms 120 similar to the one shown in FIG. 2. At activation, the friction wheel 13 rotates about a substantially vertically aligned axis of rotation about which also the bevel gear 23 will rotate. In the shown embodiment, the bevel gear 23 is not provided with diagonally aligned teeth as in the previous embodiment, but rather with a diagonal friction surface that also allows a transmission of its torque onto the belt drive roller bevel gear 232. Therein, the torque is not transferred by a form fit as in the previous embodiment, but by friction of the diagonally aligned friction surfaces of the two bevel gears 23, 232. Otherwise, the gear works similar to the gear with the diagonal teeth as shown, e.g., in FIG. 6 and/or at least partially shown in FIGS. 3A, 3B and 4. The belt drive roller bevel gear 232 may rotate about the belt drive roller axis 231 about a substantially horizontally aligned axis of rotation. The barrel of the belt drive roller 230 may be driven to a rotation by the rotation of the belt drive roller bevel gear 232. Similar as shown in FIGS. 2 and 6, the rotation of the barrel of the belt drive roller 230 drives the crossbelt 210 arranged between the belt drive roller 230 and the pressure roller 212 arranged above (omitted in FIG. 7A).

Figure 7B:
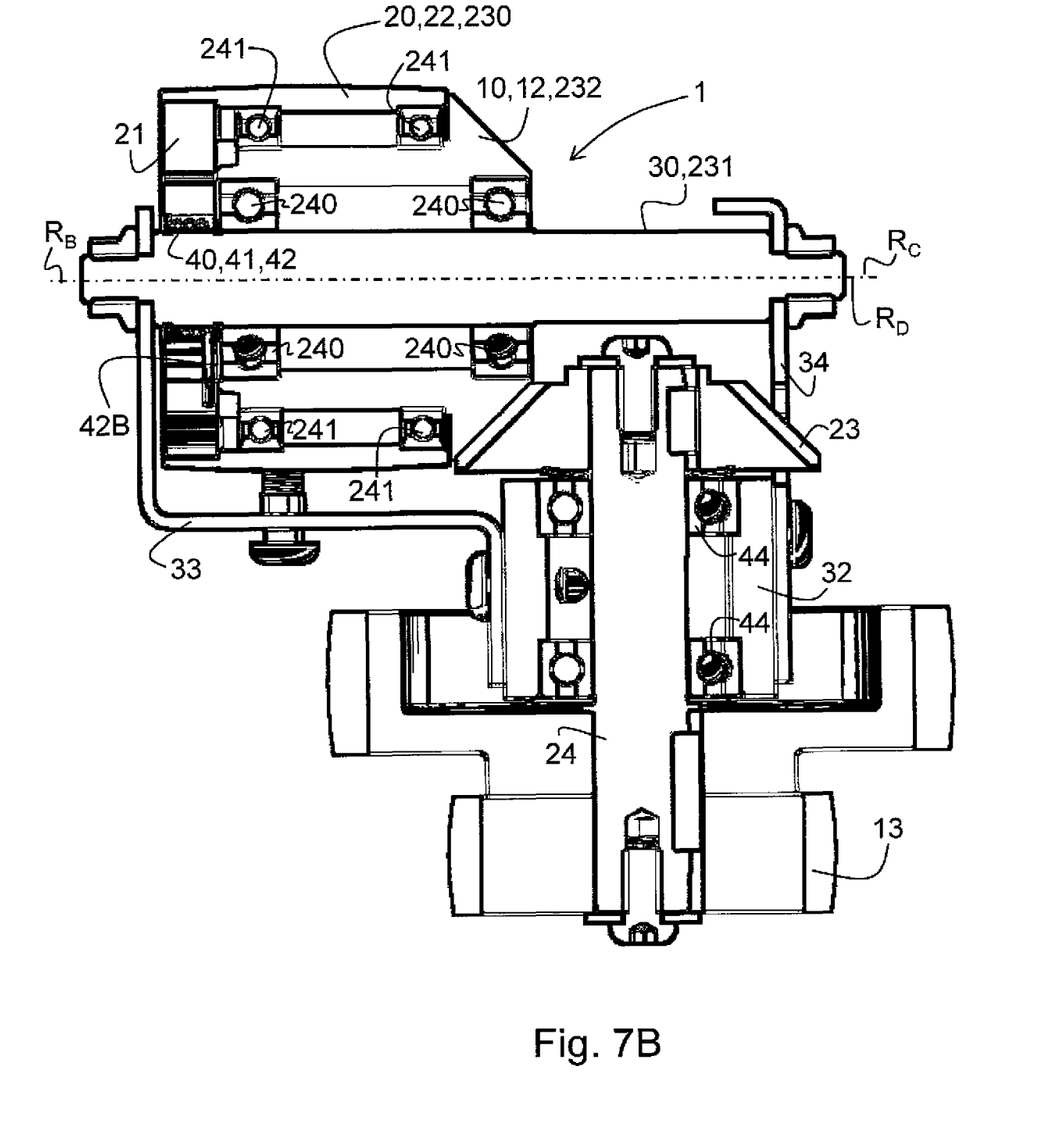
FIG. 7B is a sectional side view of the torque transmission device of FIG. 7A.

FIG. 7B shows a sectional side view of the torque transmission device 1 of FIG. 7A. The sectional view shows the inside of the belt drive roller 230. In this embodiment, the torque transmission device 1 is not arranged at the friction wheel 13, Thus, the friction wheel 13 may transmit its torque directly via the drive shaft 24 to the bevel gear 23. The drive shaft 24 may be rotatably connected via inner bearings 44 to a cylinder element 32 connected to a first frame element 33. The diagonal upper outer side of the bevel gear 23 may be covered by a friction element increasing the friction between the substantially vertically element bevel gear 23 and the substantially horizontally aligned belt drive roller bevel gear 232.

Whenever the friction wheel 13 is driven, its torque is transmitted to the belt drive roller bevel gear 232 causing a rotation of the belt drive roller bevel gear 232 about the drive-axis of rotation $R_D$ which is arranged substantially horizontally, substantially in conveying direction and/or substantially within the extension direction of the belt drive roller axis 231. The belt drive roller bevel gear 232 is mounted rotatably about the belt drive roller axis 231 via at least one inner bearing 240 arranged on the belt drive roller axis 231. The belt drive roller axis 231 is arranged in a fixed position relative to the crossbelt-sorter-cart 200. It may be connected to the first frame element 32 and/or a second frame element 34. The belt drive roller axis 231 may be arranged with at its two opposite axle ends between the first and second frame elements 33 and 34. In this fixed position, the belt drive roller axis 231 provides the support 30 of the torque transmission device 1. The belt drive roller bevel gear 232 provides the drive end 10 and the rotatable element 12 of the drive end 10 of the torque transmission device 1. It is rotatably mounted about the support 30 in form of the belt drive roller axis 231 defining the drive axis of rotation $R_D$.

At the end of the belt drive roller bevel gear 232 facing the bevel gear 23 connected to the friction wheel 13, the belt drive roller bevel gear 232 protrudes out of the barrel of the belt drive roller 230. The belt drive roller bevel gear 232 may comprise a cylindric element arranged within the belt drive roller 230 that extends substantially along the whole barrel of the belt drive roller 230. At the end facing the bevel gear 23, it comprises the inclined surfaces for receiving the torque from the bevel gear 23. At its opposite end, i.e. the end facing away from the bevel gear 23, the engaging drive element 11 (cf. FIG. 8) is provided as an extension of the drive end 10. The engaging drive element 11 is arranged so that it may interact with the coupling means 40 provided as a force fit element 41 in form of a spring element 42.

The spring element 42 may be the torsion spring shown in FIG. 5B that comprises the outwardly bent ends 42B. The spring element 42 is arranged around the drive belt roller axis 231 in a force fit, i.e. a friction force fit. Thereby, its windings/coils are wound about the drive belt roller axis 231. Thus, the spring element 42 sits tightly around the drive belt roller axis 231 so that its outwardly bent ends 42B extend substantially radially outwards from the belt drive roller axis 231. The coupling means 40 are arranged at the end of the drive belt roller axis 231 facing away from the bevel gear 23.

At least one, preferably two, outer bearing(s) 241 are arranged around the outer barrel of the drive end 10. The barrel of the belt drive roller 230 is mounted on these outer bearing(s) 241 so that it may rotate both about the belt drive roller axis 231 arranged at its cylinder axis and about the drive end 10 and/or the rotatable element 12 of the drive end 10. The barrel of the belt drive roller 230 may rotate about a belt axis of rotation $R_B$ which is, in the shown embodiment, substantially aligned with the drive axis of rotation $R_D$, thus forming a common axis of rotation $R_C$.

A rotation of the rotatable element 12 of the drive end 10 about the common axis of rotation $R_C$ driven by the friction wheel 13 provides the drive torque to the coupling means 40. A rotation of the barrel of the belt drive roller 230 and, thus, the crossbelt end 20 of the torque transmission device 1 (e.g. caused by an acceleration of the crossbelt 210) about the common axis of rotation $R_C$ provides the belt torque to the coupling means 40. The torque transmission device 1 is configured, exactly as the embodiment shown in the previous Figures, to allow the transmission of the drive torque from the rotatable element 12 of the drive end 10 to the rotatable element 22 of the crossbelt end 20. Furthermore, the torque transmission device 1 inhibits the rotation of the rotatable element 22 of the belt end 20 and the transmission of its torque to the rotatable element 12 of the drive end 10. This transmitting and inhibiting is enabled by means of the coupling means 40 and the support 30.

Figure 8:
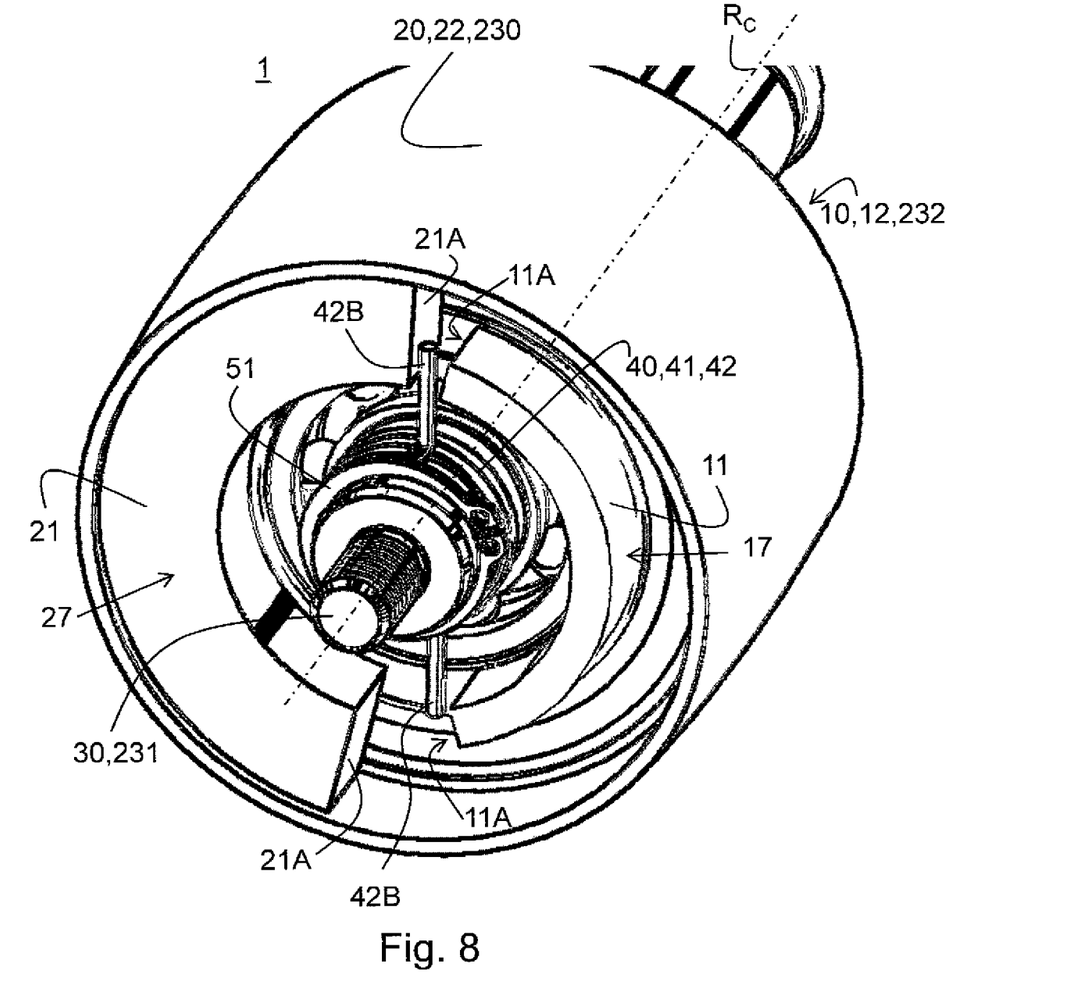
FIG. 8 is a perspective view of a coupling means of the torque transmission device of FIGS. 7A and 7B.

FIG. 8 is a perspective view of the end of the belt drive roller axis 231 at which the coupling means 40 is arranged in a force fit. In this perspective view, the first frame element 33 is omitted to grant a better view on the coupling means 40. In axial direction, the coupling means 40 may be held in position by one or more retaining rings 51 mounted on the outer diameter of the belt drive roller axis 231. The outwardly bent ends 42B of the spring element 42 define the drive-side space 17 and the belt-side space 27. In the shown embodiment, these spaces 17, 27 are arranged within an area inside the crossbelt end 20 (provided by the belt drive roller 230) and radially outward of the coils of the spring element 42.

Fixed to the inside of the barrel of the belt drive roller 230 is the engaging belt element 21. Engaging belt element 21 is provided as a ring section about the common axis of rotation $R_C$. The ring section may span over an angular section of at least 60°, preferably at least 120°, more preferably of at least 170° with respect to the common axis of rotation $R_C$. Thus, the engaging belt end 21 may fill most and/or substantially the whole angular section of the belt side space 27, e.g. at least 80% or preferably at least 90% of it. This leaves only a small clearing between the engaging flanks 21A and the outwardly bent ends 42B of the spring element 42.

A rotation of the belt end 20 caused by an acceleration of the crossbelt 210 will rotate the engaging belt element 21 about the common axis of rotation $R_C$ until one of its engaging flanks 21A abuts the corresponding outwardly bent end 42B of the spring element 42. This abutting will strengthen the friction force fit of the spring element 42 with the support 30 in form of the belt drive roller axis 231. Thus, the rotation of the belt end 20 and the belt drive roller 230 is inhibited and stopped.

Similarly, also the drive end 10 provided by the belt drive roller bevel gear 232 is connected to and/or comprises a protrusion in form of the engaging drive element 11. This engaging drive element 11 is arranged within the drive-side space 17, i.e. in a position radially between the spring element 42 and the inside of the barrel of the belt drive roller 230. The engaging drive element 11 may be provided as a ring section a ring spanning about at least 60°, preferably about at least 120°, more preferably about at least 170° about the common axis of rotation $R_C$ within the drive side space 17.

Two engaging flanks 11A at the opposite ring section ends of the engaging drive element 11 are arranged within vicinity of the two outwardly bent ends 42B of the spring element 42. Any rotation of the friction wheel 13 resulting in a corresponding rotation of the drive end 10 leads to a corresponding rotation of the engaging drive element 11 about the common axis of rotation $R_C$ until one of its engaging flanks 11A press onto the corresponding outwardly bent end 42B. This pressure is directed so that it weakens the force fit of the spring element 42 on the support shaft and/or axis 30. This allows a rotation of the coupling means 40 about the support 30 in form of the drive belt roller axis 231 and a transmission of the torque of the drive end 10 to the engaging belt element 21 of the crossbelt end 20. Thus, the drive torque is transferred to the crossbelt end 20 and may drive the belt drive roller 230.

The torque transmission devices 1 shown in the Figures operate similarly. The engaging drive element 11 and the engaging belt element 21 may span over most of the whole angular section of 360° about the common axis of rotation $R_C$. In the remaining clearance, the ends 42A, 42B of the respective spring element 42 may be arranged within a small clearance. The engaging drive element 11 and the engaging belt element 21 may be arranged in vicinity of the spring element 42 so that one of the engaging flanks 11A of the engaging drive element 11 is separated from a corresponding engaging element 21A of the engaging belt element 21 by one of the ends 42A, 42B, respectively. Every engaging flank 11A of the engaging drive element 11 substantially faces its corresponding engaging element 21A of the engaging belt element 21.

The engaging flanks 11A, 21A may be provided as flat surfaces and/or may incorporate at least one groove for receiving the corresponding end 42A, 42B of the spring element 42. The groove may receive the respective end 42A, 42B and, thus, decrease the strain on the spring element 42. Furthermore, it may enable an abutment of the substantially full, corresponding engaging flanks 11A, 21A for a safe transmission of the drive torque.

The drive means causing the drive torque may be provided by the friction wheel 13 and/or the lever arms 120. Thus, the drive means may be part of the crossbelt-sorter-cart 200 itself and/or may be arranged stationary at the crossbelt-sorter 100.

LIST OF REFERENCE NUMERALS 1 torque transmission device
10 drive end
11 engaging drive-element
11A engaging flank
12 rotatable element of the drive end
13 friction wheel
17 drive-side space
20 crossbelt end
21 engaging belt-element
21A engaging flank
22 rotatable element of the crossbelt end
23 bevel gear
24 drive shaft
25 fixing element
26 feather key
27 belt-side space
30 support
31 through-hole
32 cylinder element
33 first frame element
34 second frame element
40 coupling means
41 force fit element
42 spring element
42A inwardly bent end
42B outwardly bent end
43 outer bearing
44 inner bearing
50 support ring
51 retaining ring
52 snap ring
100 crossbelt-sorter
110 frame
120 lever arm
130 rail
200 crossbelt-sorter-cart
210 crossbelt
211 reversing roller
212 pressure roller
220 guide roller
230 belt drive roller
231 belt drive roller axis
232 belt drive roller bevel gear
240 inner bearing
241 outer bearing
$R_B$ belt-axis of rotation
$R_C$ common axis of rotation
$R_D$ drive-axis of rotation

What is claimed is:

1. A torque transmission (1) for a crossbelt-sorter-cart (200) comprising a crossbelt (210), the torque transmission device (1) comprising:
    a rotatable drive end (10) configured to be coupled to a drive means (13, 120) for driving the crossbelt (210) of the crossbelt-sorter-cart (200);
    a rotatable crossbelt end (20) configured to be coupled to the crossbelt (210) of the crossbelt-sorter-cart (200);
    an unrotatable support (30) configured to be fixed to the crossbelt-sorter cart (200); and
    a coupling means (40) connecting the drive end (10) to the crossbelt end (20) at the support (30); wherein:
    the coupling means (40) allows a transmission of a drive torque originating from the rotating drive end (10) to the crossbelt end (20) and inhibits a belt torque originating from the rotating crossbelt end (20), and
    the coupling means comprises a force element fixed to the support in a force fit.

2. The torque transmission device of claim 1, wherein the coupling means allows the transmission of at least 80% of the drive torque originating from the rotating drive end to the crossbelt end and inhibits at least 80% of the transmission of the belt torque originating from the rotating crossbelt end to the drive end.

3. The torque transmission device of claim 1, wherein the force element is fixed to the support in a friction force fit.

4. The torque transmission device of claim 3, wherein the force element is provided as a spring element.

5. The torque transmission device of claim 1, wherein the drive torque originating from the rotating drive end at least weakens the force fit in which the force element is fixed to the support.

6. The torque transmission device of claim 1, wherein the drive end comprises an engaging drive-element engaging the force element so that the torque originating from the rotating drive end at least weakens the force fit in which the force element is fixed to the support.

7. The torque transmission device of claim 1, wherein the belt torque originating from the rotating belt end strengthens the force fit in which the force element is fixed to the support.

8. The torque transmission device of claim 7, wherein the crossbelt end comprises an engaging belt-element engaging the force element so that the belt torque originating from the rotating belt end strengthens the force fit in which the force element is fixed to the support.

9. A torque transmission device (1) for a crossbelt-sorter-cart (200) comprising a crossbelt (210), the torque transmission device (1) comprising:
   a rotatable drive end (10) configured to be coupled to a drive means (13, 120) for driving the crossbelt (210) of the crossbelt-sorter-cart (200);
   a rotatable crossbelt end (20) configured to be coupled to the crossbelt (210) of the crossbelt-sorter-cart (200);
   an unrotatable support (30) configured to be fixed to the crossbelt-sorter cart (200); and
   a coupling means (40) connecting the drive end (10) to the crossbelt end (20) at the support (30); wherein:
   the coupling means (40) allows a transmission of a drive torque originating from the rotating drive end (10) to the crossbelt end (20) and inhibits a belt torque originating from the rotating crossbelt end (20),
   the support comprises a through-hole and/or a hollow cylinder element;
   a rotatable element of either the crossbelt end or the drive end is rotatably mounted within said through-hole and/or cylinder element; and
   a rotatable element of either the drive end or the crossbelt end is rotatably mounted around said through-hole and/or cylinder element.

10. The torque transmission device of claim 1, wherein: the support comprises an axis; and
   the drive end and/or the crossbelt end is rotatably mounted around said axis.

11. The torque transmission device of claim 1, wherein the drive end is rotatable about a drive-axis of rotation and a rotation of the drive end about said drive-axis of rotation provides the drive torque to the coupling means.

12. The torque transmission device of claim 11, wherein the crossbelt end is rotatable about a belt-axis of rotation and a rotation of the crossbelt end about said belt-axis of rotation provides the belt torque to the coupling means.

13. A torque transmission device (1) for a crossbelt-sorter-cart (200) comprising a crossbelt (210), the torque transmission device (1) comprising:
   a rotatable drive end (10) configured to be coupled to a drive means (13, 120) for driving the crossbelt (210) of the crossbelt-sorter-cart (200);
   a rotatable crossbelt end (20) configured to be coupled to the crossbelt (210) of the crossbelt-sorter-cart (200);
   an unrotatable support (30) configured to be fixed to the crossbelt-sorter cart (200); and
   a coupling means (40) connecting the drive end (10) to the crossbelt end (20) at the support (30); wherein:
   the coupling means (40) allows a transmission of a drive torque originating from the rotating drive end (10) to the crossbelt end (20) and inhibits a belt torque originating from the rotating crossbelt end (20),
   the drive end is rotatable about a drive-axis of rotation and a rotation of the drive end about said drive-axis of rotation provides the drive torque to the coupling means,
   the crossbelt end is rotatable about a belt-axis of rotation and a rotation of the crossbelt end about said belt-axis of rotation provides the belt torque to the coupling means, and
   the drive-axis of rotation is substantially aligned with the belt-axis of rotation forming a common axis of rotation.

14. The torque transmission device of claim 13, wherein the common axis of rotation is arranged so that the common axis of rotation penetrates a through-hole and/or so that the common axis of rotation is aligned with an axis of the support.

15. The torque transmission device of claim 13, wherein the common axis is aligned substantially vertically or horizontally.

16. The torque transmission device of claim 1, wherein the drive end comprises and/or is coupled to a rotatable friction wheel, wherein a rotation of said friction wheel provides the drive torque for driving the crossbelt of the crossbelt-sorter-cart.

17. The torque transmission device of claim 1, wherein the crossbelt end comprises and/or is coupled to a belt drive roller driving the crossbelt of the crossbelt-sorter-cart.

* * * * *